(12) United States Patent
Cho et al.

(10) Patent No.: US 10,866,463 B2
(45) Date of Patent: Dec. 15, 2020

(54) STRIP, AND BACKLIGHT UNIT AND LIQUID CRYSTAL DISPLAY INCLUDING THE SAME

(71) Applicant: SAMSUNG ELECTRONICS CO., LTD., Suwon-si (KR)

(72) Inventors: Oul Cho, Suwon-si (KR); Hyun A Kang, Suwon-si (KR); Eun Joo Jang, Suwon-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 0 days.

(21) Appl. No.: 16/543,118

(22) Filed: Aug. 16, 2019

(65) Prior Publication Data
US 2019/0369443 A1    Dec. 5, 2019

Related U.S. Application Data

(63) Continuation of application No. 14/833,722, filed on Aug. 24, 2015, now Pat. No. 10,386,678.

(30) Foreign Application Priority Data

Aug. 22, 2014 (KR) .................. 10-2014-0109887

(51) Int. Cl.
*G02F 1/13357* (2006.01)
*G02F 1/1333* (2006.01)
*F21V 8/00* (2006.01)

(52) U.S. Cl.
CPC ...... *G02F 1/133611* (2013.01); *G02B 6/0088* (2013.01); *G02F 1/133308* (2013.01);
(Continued)

(58) Field of Classification Search
CPC ......... G02F 1/133611; G02F 1/133308; G02F 1/133615; G02F 1/133605;
(Continued)

(56) References Cited

U.S. PATENT DOCUMENTS 6,322,901 B1    11/2001    Bawendi et al.
6,861,155 B2    3/2005    Bawendi et al.
(Continued)

FOREIGN PATENT DOCUMENTS

CN    103148406    6/2013
CN    103698937    4/2014
(Continued)

OTHER PUBLICATIONS

Extended European Search Report-European Patent Application No. 15181674.1 dated Jan. 8, 2016, citing this references listed within.
(Continued)

*Primary Examiner* — Charles S Chang
(74) *Attorney, Agent, or Firm* — Cantor Colburn LLP

(57) ABSTRACT

Disclosed is a mold frame including a first guide defining the position of a photoconversion layer and at least one of optical sheets disposed on the photoconversion layer, a backlight unit and a liquid crystal display including the same, and the like. The first guide includes a first surface facing the liquid crystal panel, a second surface opposite to the first surface, and a third surface extended from the edge of the first surface to the edge of second surface, wherein at least a portion of the second surface is provided with a strip, and wherein the strip is extended along the edge of the optical sheet or the photoconversion layer to overlap a region adjacent to the edge of the top surface of the optical sheet or adjacent to the edge of the top surface of the photoconversion layer.

35 Claims, 10 Drawing Sheets

(52) U.S. Cl.
CPC .. *G02F 1/133605* (2013.01); *G02F 1/133606* (2013.01); *G02F 1/133608* (2013.01); *G02F 1/133615* (2013.01); *G02F 2001/133317* (2013.01); *G02F 2001/133322* (2013.01); *G02F 2001/133614* (2013.01)

(58) Field of Classification Search
CPC ......... G02F 1/133606; G02F 1/133608; G02F 2001/133322; G02F 2001/133614; G02F 2001/13317; G02B 6/0088
USPC ...................................... 349/61–71
See application file for complete search history.

(56) References Cited

U.S. PATENT DOCUMENTS

| | | | |
|---|---|---|---|
| 7,105,051 | B2 | 9/2006 | Peng et al. |
| 7,360,937 | B2 | 4/2008 | Han et al. |
| 7,427,523 | B2 | 9/2008 | Boardman et al. |
| 8,035,772 | B2 | 10/2011 | Kim et al. |
| 8,252,205 | B2 | 8/2012 | Jun et al. |
| 8,436,964 | B2 | 5/2013 | Kim et al. |
| 8,545,736 | B2 | 10/2013 | Jun et al. |
| 9,082,982 | B2 | 7/2015 | Jun et al. |
| 9,693,475 | B2 | 6/2017 | Tang et al. |
| 9,817,270 | B2 | 11/2017 | Nagatani et al. |
| 2008/0138514 | A1 | 6/2008 | Jang et al. |
| 2008/0170179 | A1 | 7/2008 | Shiraishi |
| 2008/0170415 | A1 | 7/2008 | Han et al. |
| 2008/0225203 | A1 | 9/2008 | Kim |
| 2009/0237585 | A1 | 9/2009 | Kim |
| 2010/0110728 | A1 | 5/2010 | Dubrow et al. |
| 2010/0283072 | A1 | 11/2010 | Kazlas et al. |
| 2010/0309410 | A1 | 12/2010 | Yang et al. |
| 2012/0113671 | A1 | 5/2012 | Sadasivan et al. |
| 2012/0113672 | A1 | 5/2012 | Dubrow et al. |
| 2013/0062591 | A1 | 3/2013 | Jun et al. |
| 2013/0242226 | A1 | 9/2013 | Jeong et al. |
| 2013/0329161 | A1* | 12/2013 | Park ................. G02F 1/133621 349/58 |
| 2014/0071381 | A1 | 3/2014 | Jang et al. |
| 2014/0118911 | A1 | 5/2014 | Tang et al. |
| 2015/0009454 | A1 | 1/2015 | Nagatani et al. |

FOREIGN PATENT DOCUMENTS

| | | |
|---|---|---|
| JP | 2004231736 | 8/2004 |
| JP | 2005116267 | 4/2005 |
| JP | 2010271661 | 12/2010 |
| JP | 2013077532 | 4/2013 |
| JP | 2014089449 | 5/2014 |
| JP | 2015015105 | 1/2015 |
| KR | 1020050053442 | 6/2005 |
| KR | 1020060030350 | 4/2006 |
| KR | 1020060078676 | 7/2006 |
| KR | 1020070058072 | 6/2007 |
| KR | 1020080093539 | 10/2008 |
| KR | 1020090078547 | 7/2009 |
| KR | 1020100063172 | 6/2010 |
| KR | 1020120066322 | 6/2012 |
| KR | 1020130028487 | 3/2013 |
| KR | 1020130044071 | 5/2013 |
| KR | 1020130067632 | 6/2013 |
| KR | 1020130110945 | 10/2013 |
| KR | 1020130121430 | 11/2013 |
| KR | 1020130123718 | 11/2013 |
| KR | 1020140032811 | 3/2014 |
| WO | 2013077568 | 5/2013 |
| WO | 20130377568 | 5/2013 |

OTHER PUBLICATIONS

Japanese Office Action-Japanese Patent Application No. 2015-163176 dated Apr. 23, 2019, citing references listed within.
The Kindle Fire HDX display bleeds blue—and that's OK, Posted Oct. 27, 2013, pp. 1-4, Retrieved from the Internet Aug. 18, 2015<URL:http://arstechnica.com/gadgets/2013/10/the-kindle-fire-hdx-display-bleeds-blue- . . . >.
Chinese Office Action-Chinese Patent Application No. 201510520939.5 dated Nov. 7, 2019, citing references listed within.
Japanese Office Action—Japanese Patent Application No. 2015-163176 dated Dec. 3, 2019, citing references listed within.

* cited by examiner

STRIP, AND BACKLIGHT UNIT AND LIQUID CRYSTAL DISPLAY INCLUDING THE SAME

CROSS-REFERENCE TO RELATED APPLICATIONS

This application is a continuation application of U.S. patent application Ser. No. 14/833,722, filed on Aug. 24, 2015, which claims priority to Korean Patent Application No. 10-2014-0109887 filed on Aug. 22, 2014, and all the benefits accruing therefrom under 35 U.S.C. § 119, the content of which in its entirety is herein incorporated by reference.

BACKGROUND

1. Field

Disclosures relate to a strip to reduce light leakage, and a backlight unit and a liquid crystal display ("LCD") including the strip.

2. Description of the Related Art

According to popularization of information equipment such as a portable terminal, display quality of flat panel display devices becomes important. In relation to this, vigorous researches have been made to enhance display quality of flat panel display devices by introducing a quantum dot sheet with a plurality of semiconductor nanocrystals (also known as quantum dots) dispersed in a polymer host matrix into the flat panel display devices.

The quantum dot is a semiconductor material having a crystalline structure of a several nanometer size, and may have a high surface area per unit volume due to small size thereof and may provide quantum confinement effects. The quantum dot provides an energy-excited state by absorbing light from an excitation source, and emits energy corresponding to the energy bandgap of the quantum dot. As the quantum dots may emit light of various colors depending on their size and the composition, the quantum dots may be effectively used as a photoconversion layer in a flat panel display device such as a liquid crystal display.

SUMMARY

A display including the quantum dot-included photoconversion sheet may frequently experience a light leakage phenomenon (e.g., a blue light leakage phenomenon) at a display edge region, which may deteriorate the display quality.

An embodiment provides a mold frame that decreases a light leakage phenomenon in a flat panel display and improves light uniformity.

Another embodiment provides a backlight unit including the mold frame.

Yet another embodiment provides a liquid crystal display including the mold frame.

Further yet another embodiment provides a photoconversion sheet that decreases light leakage phenomenon and improves light uniformity.

According to an embodiment, a mold frame includes a first guide which defines a position of a photoconversion layer or a position of an optical sheet disposed on the photoconversion layer, and a strip disposed on the first guide, where the first guide includes a first surface defined to face a liquid crystal panel, a second surface opposed to the first surface, and a third surface extending from an edge of first surface to an edge of second surface. In such an embodiment, the strip is disposed on the second surface, and the strip contacts an edge portion of a top surface of the optical sheet or an edge portion of a top surface of the photoconversion layer when the optical sheet or the photoconversion layer is combined with the mold frame.

In an embodiment, the mold frame may further include a second guide disposed on the first guide and which defines a position of the liquid crystal panel. In an embodiment, the mold frame may further include a third guide disposed under the first guide and which further defines the position of the photoconversion layer or the position of the optical sheet.

In an embodiment, the first surface may support the liquid crystal panel.

In an embodiment, the second surface may define a position of the photoconversion layer, and the third surface may define the position of the optical sheet.

In an embodiment, the third surface may include a step, and an upper part or a lower part of the step may define the position of the optical sheet.

In an embodiment, the lower part of the step may protrude further than the upper part and support the bottom surface of the optical sheet.

In an embodiment, a bottom surface of the strip may face the edge portion of the top surface of the photoconversion layer or the edge portion of the top surface of the optical sheet.

In an embodiment, the strip may include at least one of: a film including a polymer matrix and a light emitting material dispersed in the polymer matrix, where the light emitting material includes a semiconductor nanocrystal, an inorganic phosphor, an organic dye or a combination thereof; a polymer film including a reflective film; and a stacked film including a light scattering layer and a light adsorption layer stacked on the light scattering layer.

In an embodiment, the polymer matrix may include a thiol-ene resin, a poly(meth)acrylate resin, an epoxy resin, a silicone resin, a urethane resin, or a combination thereof.

In an embodiment, the reflective film may include a specular reflective film or a scattered reflective film.

In an embodiment, the light scattering layer may include a polymer layer including at least one selected from silica, alumina, glass, calcium carbonate ($CaCO_3$), talc, mica, aluminum oxide, barium titanate, barium carbonate, barium sulfate, zinc oxide (ZnO), cerium oxide, titanium oxide, zirconium oxide ($ZrO_2$), aluminum hydroxide and magnesium oxide (MgO), and the light absorption layer may include a polymer layer including carbon black, a black dye, a black pigment, iron oxide, copper oxide, tin oxide or a mixture thereof. In such an embodiment, the light scattering layer may overlap the edge portion of the top surface of the optical sheet or the edge portion of the top surface of the photoconversion layer.

In an embodiment, the strip may cover an entire of the second surface.

In an embodiment, the strip may have a thickness of less than or equal to about 10 millimeters (mm).

According to another embodiment of the invention, a backlight unit includes:

a light source which emits light;

a photoconversion layer spaced apart from the light source and which converts the light incident thereto from the light source to white light and emits the white light; and a strip overlapping an edge portion of the photoconversion layer.

In an embodiment, the strip may be a photoconversion strip.

In an embodiment, the photoconversion strip may contact the edge portion of the photoconversion layer.

In an embodiment, the backlight unit may further include an optical sheet disposed over the photoconversion layer.

In an embodiment, the photoconversion strip may contact an edge portion of the optical sheet.

In an embodiment, the backlight unit may further include a mold frame and wherein the strip may be disposed between the mold frame and the edge portion of the photoconversion layer.

In an embodiment, the strip may be attached to the mold frame.

In an embodiment, the strip may be a photoconversion strip.

In an embodiment, the photoconversion strip may contact the edge portion of the photoconversion layer.

In an embodiment, the strip may include at least one of: a film including a polymer matrix and a light emitting material dispersed in the polymer matrix, where the light emitting material includes a semiconductor nanocrystal, an inorganic phosphor, an organic dye or a combination thereof; a polymer film including a reflective material; and a stacked film including a light scattering layer and a light absorption layer on the light scattering layer.

According to another embodiment of the invention, the liquid crystal display includes:

a liquid crystal panel; and a backlight unit which provides light to the liquid crystal panelwherein the backlight unit includes: a light source including a blue light emitting diode; a photoconversion layer spaced apart from the light source and which converts light incident thereto from the light source to white light and emits the white light;

a strip overlapping an edge portion of a photoconversion layer.

In an embodiment, the strip may be a photoconversion strip.

In an embodiment, the photoconversion strip may contact the edge portion of the photoconversion layer.

In an embodiment, the liquid crystal display may further include an optical sheet disposed over the photoconversion layer.

In an embodiment, the photoconversion strip may contact an edge portion of the optical sheet.

In an embodiment, the liquid crystal display may further include a mold frame and wherein the strip is disposed between the mold frame and the edge portion of the photoconversion layer.

In an embodiment, the strip may be attached to the mold frame.

In an embodiment, the strip may be a photoconversion strip.

In an embodiment, the photoconversion strip contacts the edge portion of the photoconversion layer.

In an embodiment, the strip includes at least one of: a film including a polymer matrix and a light emitting material dispersed in the polymer matrix, where the light emitting material includes a semiconductor nanocrystal, an inorganic phosphor, an organic dye or a combination thereof; a polymer film including a reflective film; and a stacked film including a light scattering layer and a light absorption layer on the light scattering layer.

According to another embodiment, a photoconversion sheet includes a polymer matrix and a light emitting material dispersed in the polymer matrix, where the light emitting material includes a semiconductor nanocrystal, an inorganic phosphor, an organic dye or a combination thereof, where a strip is disposed on a surface thereof along an edge portion.

In an embodiment, the strip may protrude from the edge portion of the photoconversion sheet to define a step structure.

In an embodiment, the strip may extend along an entire edge of the photoconversion sheet.

In an embodiment, the strip may include at least one of: a film including a polymer matrix and a light emitting material dispersed in the polymer matrix, where the light emitting material includes a semiconductor nanocrystal, an inorganic phosphor, an organic dye or a combination thereof; a polymer film including a reflective material; and a stacked film including a light scattering layer and a light absorption layer on the light scattering.

BRIEF DESCRIPTION OF THE DRAWINGS

The above and other features of the invention will become more apparent by describing in detailed exemplary embodiments thereof with reference to the accompanying drawings, in which.

DETAILED DESCRIPTION

Figure 1:
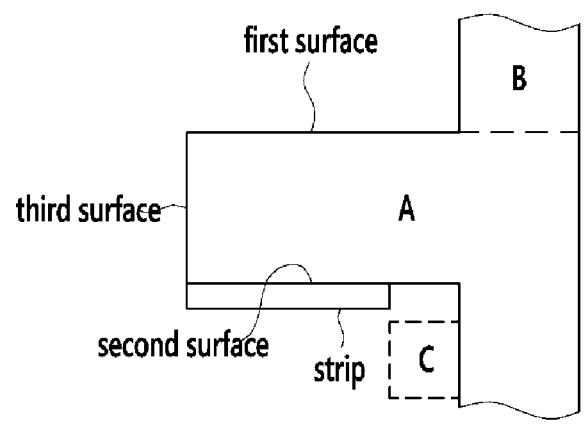
FIG. 1 is a schematic cross-sectional view of an embodiment of a mold frame.
Figure 2:
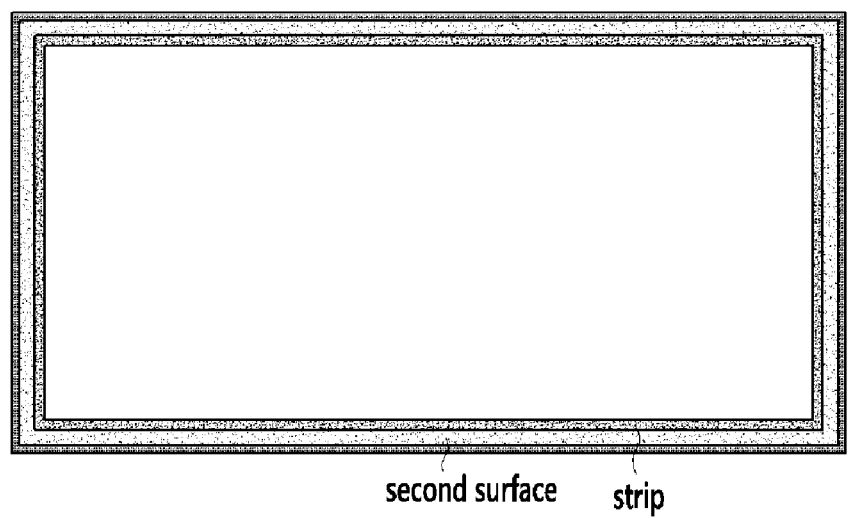
FIG. 2 is a plain view illustrating the bottom of an embodiment of a mold frame.
Figure 3:
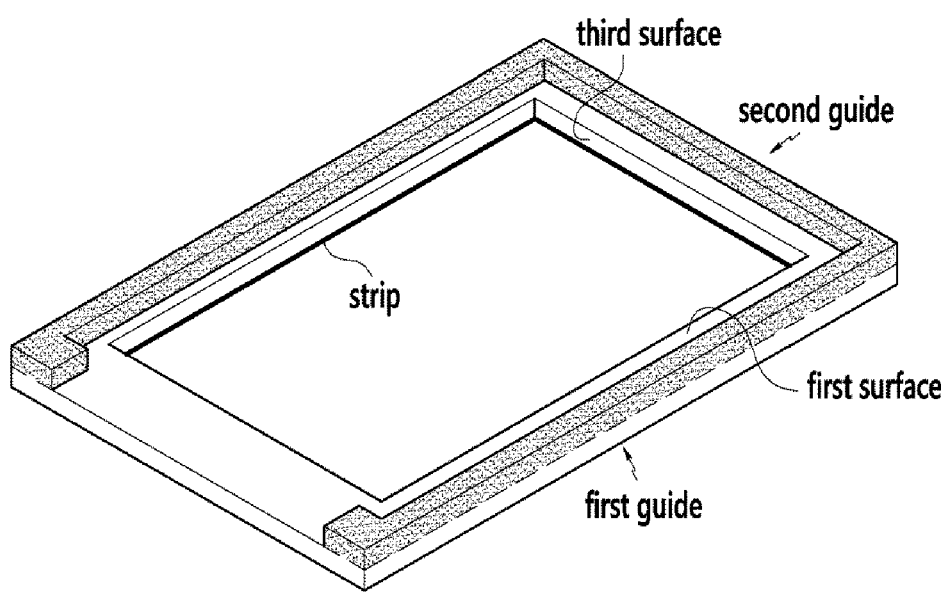
FIG. 3 is a schematic perspective view of an embodiment of a mold frame.

Embodiments now will be described more fully hereinafter with reference to the accompanying drawings. The operating principle may, however, be embodied in many different forms, and the inventive scope should not be construed as limited to the embodiments set forth herein. Rather, these embodiments are provided so that this disclosure will be thorough and complete, and will fully convey the operating principle to those skilled in the art. Like reference numerals refer to like elements throughout.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one elements relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Unless mentioned otherwise, "defining the position of a subject matter (e.g., a layer or a sheet)" in the specification refers to limiting the motion thereof toward a certain direction (e.g., up, down, left, right, or a combination thereof).

Hereinafter, embodiments will be described in detail with reference to the accompanying drawings.

FIG. 1 is a schematic cross-sectional view of an embodiment of a mold frame. In an embodiment, the mold frame may be a mold frame of a liquid crystal display device. According to an embodiment, the mold frame includes a first guide A defining the positions of a photoconversion layer (e.g. a photoconversion sheet) and an optical sheet (e.g., one or more optical sheets) disposed on the photoconversion layer of the liquid crystal display device. The mold frame may further include a second guide B disposed on the first guide and defining the position of a liquid crystal panel of the liquid crystal display device. The mold frame may further include a third guide C disposed under the first guide and further defining the position of the photoconversion sheet or the optical sheet.

Referring to FIG. 1, the first guide A has a first surface defined to face the liquid crystal panel and a second surface opposite to the first surface. The first guide has a third surface extending from an edge of first surface toward an edge of second surface. In such an embodiment, a fixing member may be provided on the first surface for fixing the position of an optical sheet and/or a liquid crystal panel. According to one embodiment, for example, the fixing member may be a protruding portion, and an accommodating member (e.g., a through hole or a blind hole) may be provided in the optical sheet or the liquid crystal panel for accommodating the protruding member. The fixing member on the first surface may be a second guide for defining the position of the liquid crystal panel. In such an embodiment, the second guide B may be disposed on the first surface at a predetermined position thereon as shown in FIG. 1.

The first guide A and, selectively, at least one of the second guide B and a third guide C may be connected to each other to form as a single unitary and indivisible unit to define an integrated structure. According to one embodiment, for example, the first surface of the integrated structure of the first guide and the second guide may support the liquid crystal panel. Alternatively, the first guide A and, selectively, at least one of the second guide B and the third guide C may be individual parts configured to be assembled. FIG. 1 shows an embodiment where the cross-section of the second guide B has a simple quadrangular shape, but it is not limited thereto, and may have various shapes (e.g., to include various members for accommodating/fixing a liquid crystal panel), in an alternative embodiment.

In an embodiment, a strip is disposed on the second surface. In one embodiment, for example, at least a portion of the second surface is provided with a strip. In such an embodiment, the strip overlaps an edge portion (a region adjacent to the edge) of a top surface of the optical sheet or an edge portion of a top surface of the photoconversion layer when the optical sheet or the photoconversion layer is combined with the mold frame. The strip may extend along an edge of the optical sheet or an edge of the photoconversion layer to overlap a region adjacent to the edge of the top surface of the optical sheet or the edge of the top surface of the photoconversion layer.

According to one embodiment, for example, at least a portion of the bottom surface of the strip may face (e.g., touch) the edge portion of the top surface of the photoconversion layer, or may face (e.g., touch) the edge portion of the top surface of any one of the optical sheets. The second surface of the first guide A may fix or define the position of the photoconversion layer, and the third surface of the first guide A may fix or define the position of the optical sheets.

Figure 4:
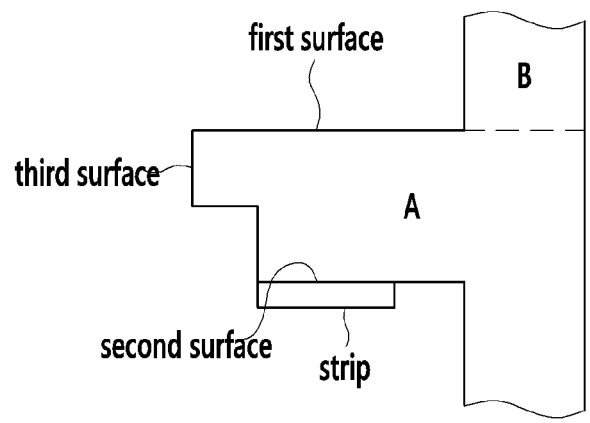
FIG. 4 is a schematic cross-sectional view of an embodiment of a mold frame according to the invention.
Figure 5:
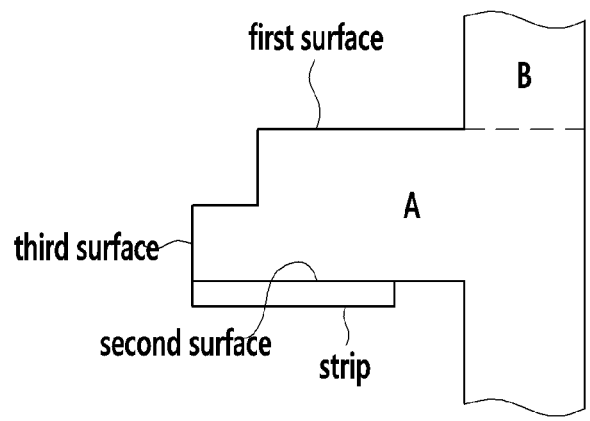
FIG. 5 is a schematic cross-sectional view of an embodiment of a mold frame.

According to an embodiment, the third surface may have a step structure. Referring to FIG. 4 or FIG. 5, the third surface having a step may define (or fix) the position of at least one optical sheet using the upper or lower part of the step. According to one embodiment, for example, the top surface of the lower part of the step may support the bottom surface of an optical sheet. In such an embodiment, the lower part of the step may protrude further than the upper part to support the bottom surface of the optical sheets.

According to another embodiment, the second surface may contact the top surface of the optical sheets to define the position of the photoconversion layer and the optical sheets disposed thereon.

The strip on the second surface may substantially decrease or effectively prevent the light leakage (e.g., blue light leakage) at a screen edge part of a flat panel display device, e.g., the liquid crystal display device.

Many researches have been made to improve the display quality of a display device (e.g., a display device including a flat panel or a curved panel, or a flexible display device) by using a sheet including a light emitting material such as quantum dots. Some liquid crystal display devices may use a combination of a light emitting diode ("LED") emitting visible light, for example blue light, and a photoconversion sheet (including a light emitting material such as quantum dots) instead of a white light source. However, in the case of a flat panel display device using a photoconversion sheet, the blue light leakage phenomenon typically occurs in a screen edge part. Without being bound by any theory, such blue light leakage phenomenon may occur due to scattered blue light and a light circulation decrease at the edge part. Here, the scattered blue light is blue light emitted from the blue LED but not incident to the light guide panel ("LGP") or the photoconversion sheet. The scattered blue light may not be effectively converted into white color light by the photoconversion layer, and thus may cause the blue light leakage at the screen edge part of a final display device.

The visible light emitted from an LED (e.g., a blue LED) may be circulated due to the presence of an optical sheet disposed on the photoconversion sheet and a reflector formed on the bottom part of the display device (and optionally disposed under the LGP), and such circulation may increase chances of encountering the quantum dots in the photoconversion sheet for the blue light. However, the blue light have a decreased chance of circulation especially at the edge part, and thus the photoconversion degree at the edge part becomes different from other regions (e.g., a central region) of panel. The blue light leakage may cause a sharp increase in the color temperature of the screen edge part, resulting in deterioration of the color uniformity such that a user may recognize such deterioration in display quality.

In an embodiment, the mold frame may substantially or effectively mitigate the blue light leakage phenomenon. In an embodiment, the mold frame includes a strip on the bottom surface (e.g., the second surface in FIG. 1) of the first guide defining the position of the photoconversion sheet, the display panel, or the like. In such an embodiment, the scattered blue light may be converted into light having a longer wavelength by the strip. Alternatively, the strip may have a reflective function or scattering/absorptive functions, allowing the blue light at the edge part to have more chances of light circulation.

According to one embodiment, the strip may include at least one of a film including a polymer matrix and a light emitting material dispersed in the polymer matrix (hereinafter referred to as a photoconversion strip), a reflective film, a film having a multi-layer structure, e.g., a stacked film, including a light scattering layer and a light absorption layer on (e.g., disposed directly on or contacting) the light scattering layer.

The strip may be disposed or provided on the second surface in a predetermined manner. In one embodiment, for example, the strip may be provided on the second surface by spraying a composition having a predetermined composition or may be adhered on the second surface using an additional adhesive agent (e.g., adhesives or a double-sided adhesive tape), but is not limited thereto.

In such an embodiment, types of the polymer matrix are not particularly limited as long as it may be used as a host matrix for a light emitting material (e.g., a plurality of light emitting particles). The polymer matrix may include a transparent polymer.

In one embodiment, for example, the polymer matrix may include a thiol-ene resin (e.g., a polymerization product of a first monomer including at least two thiol (SH) groups at a terminal end and a second monomer including at least two carbon-carbon unsaturated bonds at a terminal end: see US Patent Publication No. 2012/0001217, the entire contents of which are incorporated herein by reference), a poly(meth) acrylate-based resin, an epoxy resin, a urethane resin, an olefin-based resin, a vinyl-based resin (polystyrene, polyvinyl pyrrolidone, or the like), a polyester, and silicone resin, but is not limited thereto.

In such an embodiment, the light emitting material may include a semiconductor nanocrystal, an inorganic phosphor, an organic dye, or a combination thereof. The absorption wavelength and the light emitting wavelength of the light emitting material are not particularly limited, as long as the material may absorb blue light, or ultraviolet ("UV") light, to emit light of a wavelength of lower energy than that of the absorbed light (e.g., green light, red light, or the like).

The semiconductor nanocrystal (also known as a quantum dot) may emit light, which may vary with a composition and a size of the quantum dot. In an embodiment, the semiconductor nanocrystal may include a Group II-VI compound, a Group III-V compound, a Group IV-VI compound, a Group IV compound or elementary substance, or a combination thereof.

In such an embodiment, the Group II-VI compound may include at least one selected from a binary element compound selected from CdSe, CdTe, ZnS, ZnSe, ZnTe, ZnO, HgS, HgSe, HgTe, MgSe, MgS, and a mixture thereof; a ternary element compound selected from CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof; and a quaternary element compound selected from HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof. In such an embodiment, the Group III-V compound may include at least one selected from a binary element compound selected from GaN, GaP, GaAs, GaSb, AlN, AlP, AlAs, AlSb, InN, InP, InAs, InSb, and a mixture thereof; a ternary element compound selected from GaNP, GaNAs, GaNSb, GaPAs, GaPSb, AlNP, AlNAs, AlNSb, AlPAs, AlPSb, InNP, InNAs, InNSb, InPAs, InPSb, and a mixture thereof; and a quaternary element compound selected from GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a mixture thereof. In such an embodiment, the Group IV-VI compound may include at least one selected from a binary element compound selected from SnS, SnSe, SnTe, PbS, PbSe, PbTe, and a mixture thereof; a ternary element compound selected from SnSeS, SnSeTe, SnSTe, PbSeS, PbSeTe, PbSTe, SnPbS, SnPbSe, SnPbTe, and a mixture thereof; and a quaternary element compound selected from SnPbSSe, SnPbSeTe, SnPbSTe, and a mixture thereof. In such an embodiment, the Group IV compound may include at least one selected from an elementary substance selected from Si, Ge, and a mixture thereof; and a binary element compound selected from SiC, SiGe, and a mixture thereof.

In such an embodiment, the binary element compound, the ternary element compound, or the quaternary element compound may exist in a uniform concentration in the semiconductor nanocrystal particle or partially different concentrations in a same particle. The semiconductor nanocrystal may have a core/shell structure, in which a semiconductor nanocrystal surrounds another semiconductor nanocrystal. The elements in the shell may have a concentration gradient such that the concentration thereof becomes gradually lower from the shell to the core. In an embodiment, the semiconductor nanocrystal may have a structure including a semiconductor nanocrystal core and a multi-layer shell surrounding the core. The multi-layer shell may have a two or more layered shell structure. Each layer of the multi-layer shell may have a single composition, or an alloy or concentration gradient.

In an embodiment, the semiconductor nanocrystal may have a structure in which the material composition for the shell has a higher energy band gap than that of the core, thereby effectively showing the quantum confinement effect. In an embodiment, where the semiconductor nanocrystal has a multi-layered shell, the energy band gap of the shell disposed on the exterior of the core is higher than the shell closer to the core. The semiconductor nanocrystal may have an UV to infrared wavelength range.

In an embodiment, the semiconductor nanocrystal may have quantum efficiency of greater than or equal to about 50%, for example, greater than or equal to about 70%, and for another example, greater than or equal to about 90%. In such an embodiment, where the semiconductor nanocrystal may have quantum efficiency in the aforementioned ranges, luminous efficiency of a device may be improved.

The semiconductor nanocrystal may have a full width at half maximum ("FWHM") of a light emitting wavelength spectrum of less than or equal to about nanometers (nm), for example, less than or equal to about 40 nm, or less than or equal to about 30 nm, without limitation. The semiconductor nanocrystal may have a particle diameter (in case of a non-spherical particle, the greatest length) in a range of about 1 nm to about 100 nm. In one embodiment, for example, the semiconductor nanocrystal may have a particle diameter (in case of a non-spherical particle, the greatest length) in a range of about 1 nm to about 20 nm.

Shapes of the semiconductor nanocrystal are not particularly limited and may include any shape available in the art. In one embodiment, for example, the semiconductor nanocrystal may be spherical, pyramidal, multi-armed, or cubic nanoparticles, nanotubes, nanowires, nanofibers, nanoplate, or the like.

The semiconductor nanocrystal may be synthesized according to any known method or may be commercially available.

In an embodiment, where the light emitting material includes the inorganic phosphor, kinds or sizes of the inorganic phosphor are not particularly limited if the inorganic phosphor is capable of absorbing blue light and emitting light having a desired wavelength. In one embodiment, for example, the inorganic phosphor may be a nano-sized inorganic phosphor. The inorganic phosphor may have any composition. In one embodiment, for example, the inorganic phosphor may include garnet phosphors, silicate-based phosphors, sulfide-based phosphors, acid nitride phosphors, nitride phosphors, aluminate-based phosphors, or a combination thereof, but is not limited thereto. The garnet phosphors may include $Y_3Al_5O_{12}:Ce^{3+}$ (YAG:Ce), $Tb_3Al_5O_{12}:Ce^{3+}$ (TAG:Ce), or a combination thereof. The silicate-based phosphors may include $(Sr,Ba,Ca)_2SiO_4:Eu^{2+}$, $(Sr,Ba,Ca,Mg,Zn)_2Si(OD)_4:Eu^{2+}$ (wherein D=F, Cl, S, N, Br), $Ba_2MgSi_2O_7:Eu^{2+}$, $Ba_2SiO_4:Eu^{2+}$, $Ca_3(Sc,Mg)_2Si_3O_{12}:Ce^{3+}$ or a combination thereof. The sulfide-based phosphors may include $(Ca,Sr)S:Eu^{2+}$, $(Sr,Ca)Ga_2S_4:Eu^{2+}$, or a combination thereof. The acid nitride phosphors may include $SrSi_2O_2N_2:Eu^{2+}$, $SiAlON:Ce^{3+}$, $\beta$-$SiAlON:Eu^{2+}$, Ca-$\alpha$-$SiAlON:Eu^{2+}$, $Ba_3Si_6O_{12}N_2:Eu^{2+}$, or a combination thereof. The nitride phosphors may include $CaAlSiN_3:Eu^2$, $(Sr,Ca)AlSiN_3:Eu^{2+}$, $Sr_2Si_5Na:Eu^{2+}$, or a combination thereof. The aluminate-based phosphors may include $(Sr,Ba)Al_2O_4:Eu^{2+}$, $(Mg,Sr)Al_2O_4:Eu^{2+}$, $BaMg_2Al_{16}O_{27}:Eu^{2+}$, or a combination thereof. The inorganic phosphor may have any size, and may be, for example, nano-sized inorganic phosphors or micrometer sized inorganic phosphors. The inorganic phosphor may be synthesized according to any known method or may be commercially available.

In an embodiment, where the light emitting material includes the organic dye, the organic dye may be an organic material dye having light emitting characteristics, and kinds thereof are not particularly limited. In one embodiment, for example, the organic dye may be an organic fluorescent dye and/or an organic phosphorescent dye, but not being limited thereto. In one embodiment, for example, the organic dye may be an organic metal complex or an organic material dye, but not being limited thereto. In one embodiment, the organic dye may be, for example, an organic dye in a form of an organic metal complex such as tris(2-phenylpyridine) iridium ("Ir(ppy)"), or an organic dye including an organic material such as coumarin, rhodamine, phenoxazone, stilbene, terphenyl, or quarterphenyl. The organic dye may be synthesized according to any synthesis method known in the art or may be commercially available.

In an embodiment, the concentration of the light emitting material (e.g., quantum dots, inorganic phosphor, or organic dye) in the photoconversion strip may be controlled to adjust the color temperature of an edge of a display screen of the display device to a desirable level. In an embodiment, the concentration of the light emitting material (e.g., quantum dots, inorganic phosphor, or organic dye) in the photoconversion strip is not particularly limited and may be appropriately selected in light of the types of polymer matrix, the types of light emitting material, the color temperature of the screen edge, or the thickness or to the width of the photoconversion strip, or the like.

In another embodiment, the strip may include a reflective film. In one embodiment, for example, the reflective film may include a scattered reflective film or a specular reflective film. The reflective film may have light transmittance of less than about 10%, for example, less than about 9%, less than about 5%, or less than about 1%. The reflective film may be any reflective film available in the display field. In one embodiment, for example, the reflective film may include the polymer matrix and an inorganic material (e.g., titanium dioxide particles, barium sulfate, or a combination thereof) dispersed in the polymer matrix. In one embodiment, For example, the specular reflective film may include a silver deposit film, a multi-layered reflective film, an anodic aluminum oxide film, or the like, but is not limited thereto. The scattered reflective film includes a polymer stretched film (e.g., white polyester biaxially oriented film (white polyester film), white polypropylene stretched film, or the like), but is not limited thereto. The reflective film may be fabricated by the known method or may be commercially available.

According to another embodiment, the strip may include a stacked film including a light scattering layer and a light absorption layer disposed directly on the light scattering layer. In such an embodiment, The light scattering layer may include silica, alumina, glass, calcium carbonate ($CaCO_3$), talc, mica, aluminum oxide, barium titanate, barium carbonate, barium sulfate, zinc oxide (ZnO), cerium oxide, titanium oxide, zirconium oxide ($ZrO_2$), aluminum hydroxide, and magnesium oxide (MgO), but is not limited thereto. The light scattering layer may be a polymer film including the aforementioned material, but is not limited thereto. In an embodiment, The light absorption layer may include carbon black, a black dye, a black pigment, iron oxide, copper oxide, tin oxide, or a mixture thereof. The light absorption layer may be a polymer layer including the aforementioned material. Types of the polymer for the light scattering layer and the light absorption layer are not particularly limited, and may be selected appropriately. In one embodiment, for example, the polymer may be selected from the material set forth above for the polymer matrix, but is not limited thereto. In one embodiment, for example, the light absorption layer may include an acryl-based polymer resin coated with carbon black, a urethane-based polymer resin coated with carbon black, or a combination thereof. In such an embodiment, the strip may be disposed in the mold frame to allow the light scattering layer to overlap the region adjacent to the edge of the top surface of the optical sheet or the top surface of the photoconversion layer.

Figure 12:
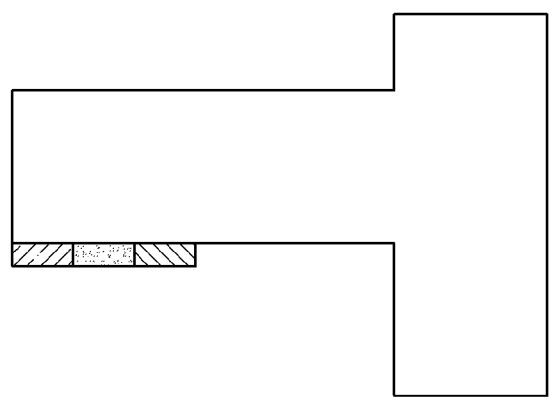
FIG. 12 is a schematic cross-sectional view of an alternative embodiment of a mold frame.

According to another alternative embodiment, the strip may include (e.g., be a combination of) at least two of a film including a polymer matrix and a light emitting material dispersed in the polymer matrix, a reflective film, and a stacked film including a light scattering layer and a light absorption layer stacked on the light scattering layer. In one embodiment, For example, the strip may be a hybrid film in which a film (hereinafter, also called as photoconversion strip) including a polymer matrix and a light emitting material dispersed in the polymer matrix and a reflective film are arranged side by side. In one embodiment, for example, the strip may have a form including at least two of the photoconversion strip, the reflective film, and the stacked film that are arranged side by side (see FIG. 12). According to another alternative embodiment, the strip may have a stacked structure of the photoconversion strip and the reflective film.

In an embodiment, as described above, the strip may substantially mitigate or effectively prevent the light leakage (e.g., blue light leakage) of the display device. In one embodiment, for example, the strip may decrease the color temperature of the edge of the display device. According to an embodiment, the strip may play a role of decreasing the color temperature of light emitted from the screen edge part of the display device. The decrease in the color temperature may be made to such an extent that in a curve plotting the color temperature (y-axis) over the position from the screen edge of the display device to the center thereof (x-axis), the difference between the color temperature of the screen center and the color temperature obtained by extrapolation with respect to the y-axis at the position having an average color temperature within 1 centimeter (cm) from the screen edge may be less than or equal to about 5000 K, less than or equal to about 4500 K, less than or equal to about 4000 K, less than or equal to about 3500 K, or less than or equal to about 3000 K. According to one embodiment, for example, the difference between the color temperature of the screen edge of the display and the color temperature of the screen center thereof may be less than or equal to about 5000 K. Accordingly, an embodiment of the display device including the mold frame may have improved display quality.

In an embodiment, the color temperature at the screen edge may be lowered to the desirable level (e.g., optimized level) by adjusting the features or composition of the strip (e.g., by adjusting a concentration of light emitting material, a thickness, or a width). The optimized color temperature may be selected referring to the color temperature at the center of the screen or the target color temperature of the corresponding display.

According to an embodiment, a width of the region that is adjacent to the edge of the top surface of the optical sheet or the top surface of the photoconversion layer and is overlapping the strip (hereinafter, the overlapping region) is not particularly limited and may be appropriately selected in light of the type of the strip, type of the display panel, a desired color temperature of the edge part, or the like. In one embodiment, For example, the width of overlapping region may be less than about 5 millimeters (mm), but is not limited thereto. In an embodiment, the thickness of the strip is not particularly limited and may be appropriately selected considering the type of strip, the display type, and the desired color temperature of the edge part. In one embodiment, For example, the strip may have a thickness of less than or equal to about 10 mm, less than or equal to about 5 mm, or less than or equal to about 1 mm, but is not limited thereto.

The mold frame may further include a cover part for covering an LED light source or a light guide plate under the first guide A or the third guide C, but is not limited thereto.

Detailed features, e.g., the shape and material, of the cover part are known in the art, and are not particularly limited.

In one embodiment, for example, each member constituting the mold frame may be made of an injection-moldable plastic material (e.g., polyethylene terephthalate, polyethylene, polycarbonate, polyurethane, polypropylene, acrylonitrile butadiene styrene ("ABS") resin, or polystyrene), but it is not limited thereto.

According to another embodiment, the backlight unit may include:

a light source;

a photoconversion layer spaced apart from the light source and which converts light incident from the light source to white light and emits the converted light to a liquid crystal panel;

an optical sheet disposed on the photoconversion layer; and an embodiment of the mold frame according to the invention.

In an embodiment, the light source may be an LED light source, but is not limited thereto. The LED light source includes a plurality of LED chips that emits light having a predetermined wavelength. The LED light source may be an LED light source that emits blue light or an LED light source that emits UV rays.

The backlight unit may be an edge type backlight unit further including a light guide panel disposed between the light source and the photoconversion layer. The light guide panel may increase uniformity of light from the light source and transmitted to the display area, and may include a transparent acrylic plate. In one embodiment, for example, a plurality of dots or V-holes may be formed on the lower surface of the light guide panel to uniformly reflect light, but not being limited thereto. The rear side of the light guide panel may be provided with a reflector. The reflector is a plate having high light reflectance, and may decrease the light loss by back-reflecting light incident from the rear side of light guide panel to the light guide side. Alternatively, the backlight unit may be a direct lighting type without a light guide panel. The direct lighting backlight unit is also known in the art, and any detailed description thereof will be omitted.

In an embodiment, the photoconversion layer is spaced apart from the light source at a predetermined distance, and converts light emitted from the light source to white light and emits the light toward the liquid crystal panel (not shown). According to one embodiment, for example, the photoconversion layer may include a polymer matrix and a semiconductor nanocrystal dispersed in the polymer matrix. The types of polymer matrix and the types of semiconductor nanocrystal for providing a photoconversion layer and the method of manufacturing the photoconversion layer are known in the art, and are not particularly limited. In one embodiment, For example, the photoconversion layer may include the polymer matrix and the semiconductor nanocrystal, as described above.

When the light emitted from the light source is passed through the photoconversion layer, blue light, green light and red light are mixed to provide white light. In an embodiment, the photoconversion layer may include a plurality of layers. In such an embodiment, the plurality of layers may be disposed in such a manner that each of them has a light emitting wavelength with lower energy toward the LED light source. In one embodiment, for example, where the LED light source is a blue LED light source, the photoconversion layer may include a red photoconversion layer and a green photoconversion layer which are sequentially stacked in a direction away from the LED light source.

In an embodiment, an optical sheet may be disposed on the photoconversion layer, and the optical sheet may include at least one of a diffusion plate, a prism sheet, a microlens sheet, and a luminance improvement film (e.g., a double brightness enhancement film ("DBEF")), but is not limited thereto.

Figure 6:
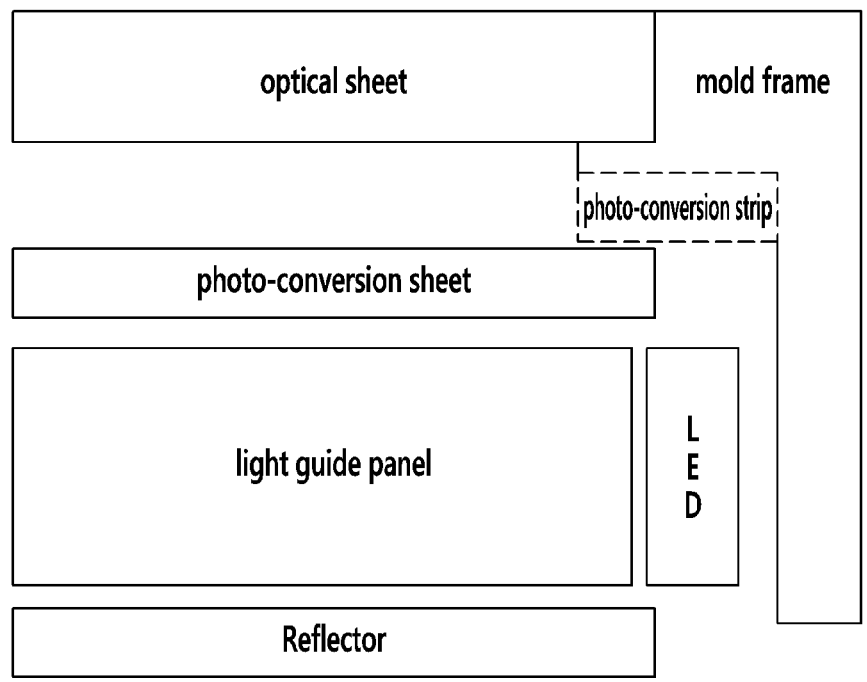
FIG. 6 is a schematic cross-sectional view of an embodiment of a backlight unit including a mold frame.

FIG. 6 shows an embodiment of a backlight unit, where a photoconversion strip is disposed on the second surface of a mold frame. In such an embodiment, the mold frame is substantially the same as the mold frame described above. The photoconversion strip may be a film including a polymer matrix and a semiconductor nanocrystal, an inorganic phosphor, an organic dye, or a combination thereof dispersed in the matrix. The photoconversion strip may enhance the white light at the edge part showing insufficient photoconversion otherwise and may increase the light conversion efficiency of the edge part. In addition, the inherent color gamut of the light emitting material (e.g., a semiconductor nanocrystal) may be maintained at the edge part. In addition, as the light conversion efficiency may increase at the edge part in the display, the average luminance and light uniformity may also be enhanced in the entire screen of the display.

According to one embodiment, for example, the photoconversion strip may have the same composition as that of the photoconversion layer.

Figure 7:
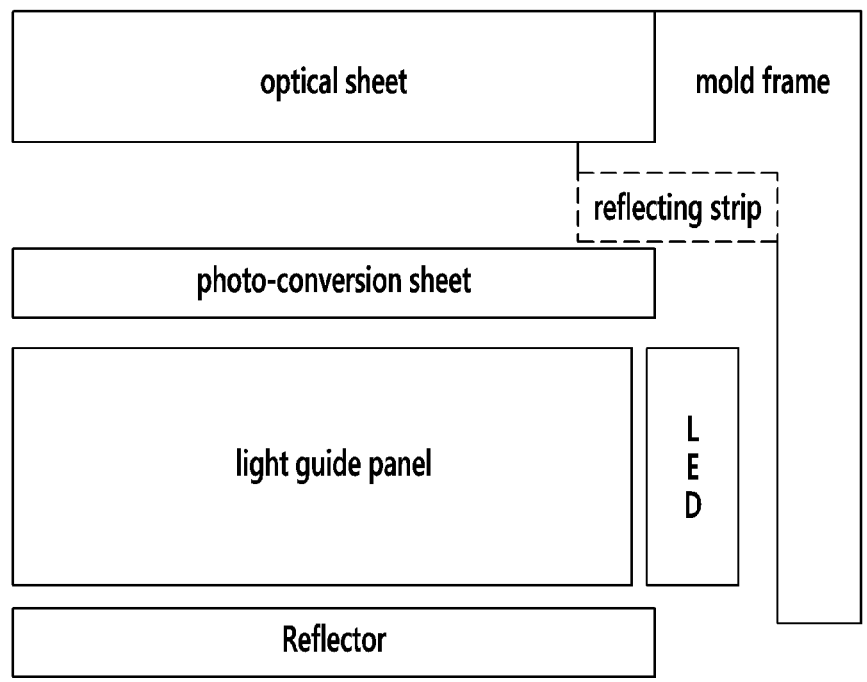
FIG. 7 is a schematic cross-sectional view of an alternative embodiment of a backlight unit including a mold frame.

FIG. 7 shows an alternative embodiment of a backlight unit, where the polymer film including a reflective material is provided as a strip on the second surface of the mold frame. In such an embodiment, the light has an increased chance of circulation such that efficiency of photoconversion may be substantially improved.

Figure 8:
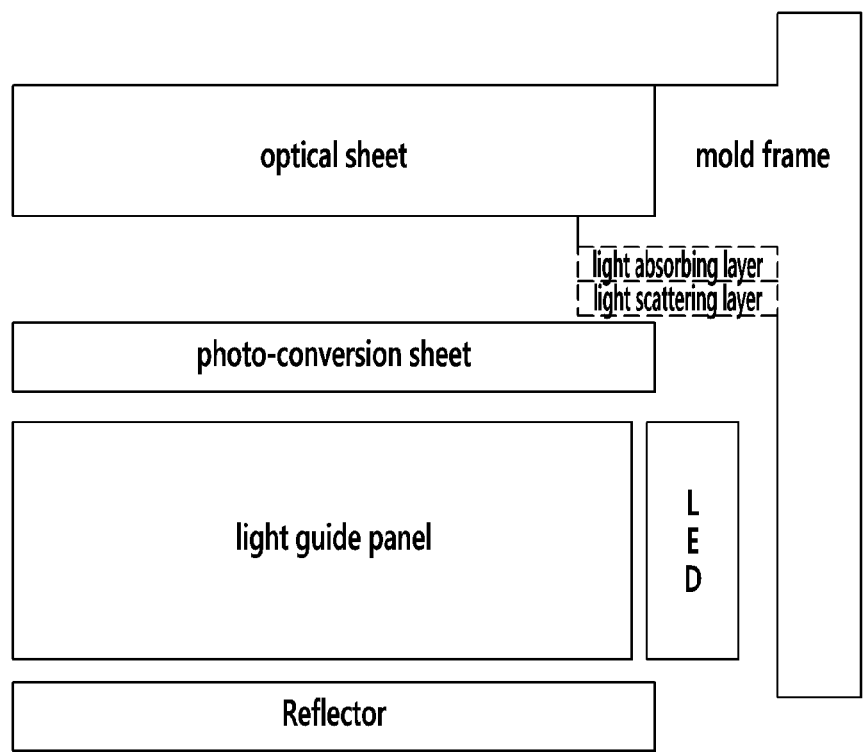
FIG. 8 is a schematic cross-sectional view of another alternative embodiment of a backlight unit including a mold frame.

FIG. 8 shows an alternative embodiment of a backlight unit, where the second surface of the mold frame includes a stacked film including a light scattering layer and a light absorption layer stacked on the light scattering layer. In such an embodiment, the scattered blue light has increased chances of encountering with the quantum dots in the photoconversion layer, and the light absorption layer may further suppress the blue light leakage.

According to another embodiment, the liquid crystal display includes:

a liquid crystal panel;

the backlight unit irradiating light to the liquid crystal panel; and a mold frame.

In such an embodiment, the mold frame and the back light unit are substantially the same as those in embodiments described above, and any repetitive detailed description thereof will be omitted. In such an embodiment, the liquid crystal panel is not particularly limited, and may include any known or commercially available liquid crystal panel.

Figure 9:
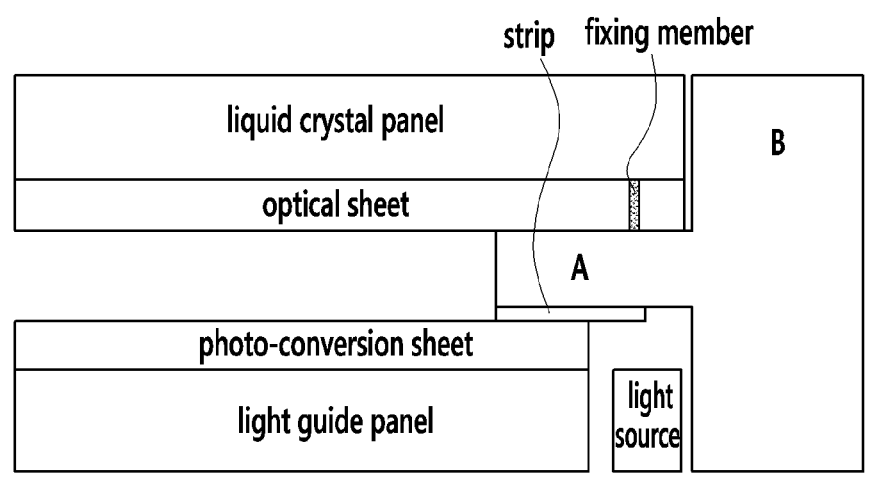
FIG. 9 is a schematic cross-sectional view of an embodiment of a liquid crystal display including a mold frame.
Figure 10:
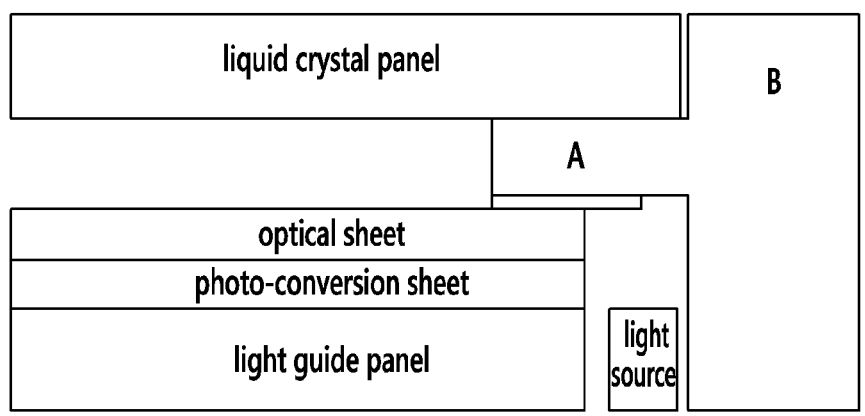
FIG. 10 is a schematic cross-sectional view of an alternative embodiment of a liquid crystal display including a mold frame.
Figure 11:
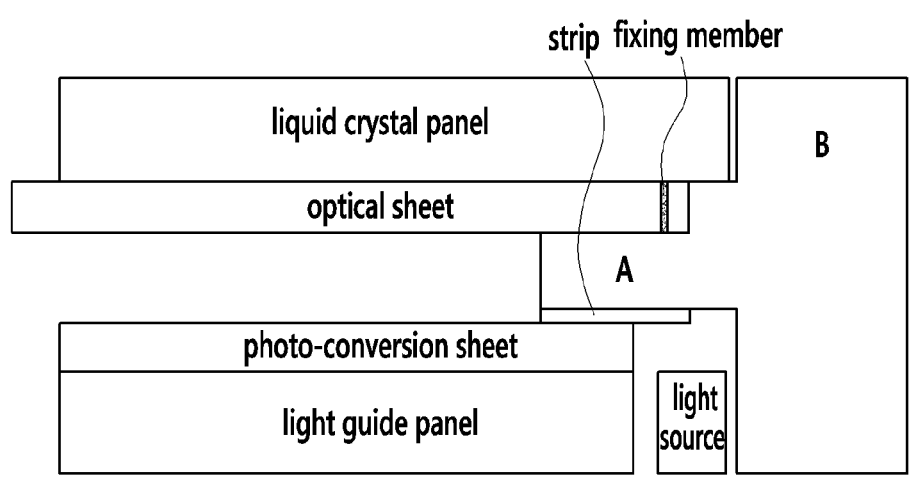
FIG. 11 is a schematic cross-sectional view of another alternative embodiment of a liquid crystal display including a mold frame.

FIG. 9 to FIG. 11 schematically show cross-sectional views of embodiments of the liquid crystal display.

In an embodiment, as shown in FIG. 9, the liquid crystal display may include a fixing member for fixing an optical sheet on the first surface of the first guide A, and a through hole or a blind hole for accommodating the fixing member may be defined or formed through the optical sheet. In such an embodiment of the liquid crystal display shown in FIG. 9, the first surface supports the optical sheet, and the optical sheet supports the liquid crystal panel. The fixing member may extend to fix the position of the liquid crystal panel as well as the optical sheet. In an embodiment, as shown in FIG. 9, the second surface of the first guide defines the position of the photoconversion layer or sheet. In such an embodiment, the strip on the second surface is substantially the same as that of embodiments described above, and any repetitive detailed description thereof will be omitted. In such an embodiment, the strip may be disposed to overlap an edge of the photoconversion sheet.

FIG. 10 is a cross-sectional view schematically showing an alternative embodiment of the liquid crystal display.

Referring to FIG. 10, in an embodiment, the first surface of the first guide A supports the liquid crystal panel. In such an embodiment, the second guide B is disposed or provided adjacent to the edge of the liquid crystal panel, but is not limited thereto. According to another alternative embodiment, the second guide B may be a fixing member disposed on the first surface of the first guide A. In such an embodiment, the liquid crystal panel may have a recessed portion for accommodating the fixing member on the bottom surface. In an embodiment, as shown in FIG. 10, the second surface of the first guide defines the position of the optical sheet and the photoconversion sheet. In such an embodiment, the strip disposed on the second surface is substantially the same as that of embodiments described above, and any repetitive detailed description thereof will be omitted. In such an embodiment, the strip is disposed to overlap the edge of the top surface of optical sheet. While not in contact with the photoconversion sheet, the strip also overlaps with an edge of the photoconversion sheet.

FIG. 11 is a cross-sectional view schematically showing another alternative embodiment of a liquid crystal display. Referring to FIG. 11, in an embodiment, the first surface of the first guide A supports the liquid crystal panel. The third surface of first guide A forms a step, and a surface of the third surface facing the liquid crystal panel may support the optical sheet and may include a fixing member for fixing the optical sheet. In an embodiment, as shown in FIG. 11, the second surface of first guide defines the position of the photoconversion sheet. In such an embodiment, the strip disposed on the second surface is substantially the same as that of embodiments described above, and any repetitive detailed description thereof will be omitted. In such an embodiment, the strip is disposed to contact and overlap the edge of photoconversion sheet.

According to another alternative embodiment, the liquid crystal display may further include the photoconversion sheet including a polymer matrix and a semiconductor nanocrystal (including quantum dots), an inorganic phosphor, or a combination thereof dispersed in the polymer matrix, and the strip is disposed on one side surface of the photoconversion sheet and extending along the edge of at least a part of the photoconversion sheet. The strip may protrude from the edge of the photoconversion sheet to define a step. The strip may extend along the entire edge of the photoconversion sheet. The photoconversion sheet may be a quantum dot-included sheet. In such an embodiment, the polymer matrix, the semiconductor nanocrystal, the inorganic phosphor and the strip are substantially the same as those in embodiments described above, and any repetitive detailed description thereof will be omitted.

Hereinafter, embodiments will be described in greater detail with reference to examples.

EXAMPLES

Example 1

A reflective film strip having a total width of 7 mm (total length: 40 cm), a phosphor-included strip having a total width of 7 mm (total length: 40 cm) and a quantum dot-included strip having a total width of 7 mm (total length: 40 cm) are prepared, and the color temperature difference between a center part of a display screen (hereinafter, screen center part) and an edge part of the display screen (hereinafter, screen edge part) is measured before and after the strip is attached to form the liquid crystal display device shown in FIG. 11.

The reflective film strip is a white polyethylene terephthalate ("PET") film (manufacturer: SKC, trade name: SY90) having a thickness of 300 micrometers (μm), and the region overlapping the photoconversion layer is 2 mm width.

The phosphor-included photoconversion strip is a 200 μm-thick film that includes a plurality of inorganic phosphors ($Y_3Al_5O_{12}$:$Ce^{3+}$ (YAG:Ce)) having a size of about 10 μm in a polymer matrix (e.g., the polymer matrix described above) (in an amount of 8 gram of the inorganic phosphors per 100 gram of the polymer matrix), and the region overlapping the photoconversion layer has a width of 2 mm.

The photoconversion strip including quantum dots is a 200 μm-thick film that includes InP/ZnS quantum dots in the polymer matrix (in an amount of 1 gram of the QDs per 100 gram of the polymer matrix), and the region overlapping the photoconversion layer has a width of 2 mm.

The strip is attached to the second surface of the mold frame using a double-sided adhesive tape.

Before and after the strips are attached, the Cx value, the Cy value, the color temperature of the screen edge, and the difference between the color temperature of the screen center part and the color temperature of the screen edge part are measured by using CS-2000 equipment manufactured by Konica Minolta (at a measuring angle of 1 degree), and the results are shown in the following Table 1.

TABLE 1

When being equipped with a 7 mm-width strip on an edge part having a color temperature difference of 10,000K (T) or more relative to the center

| | Center | | | Reflective film 7 mm | | |
|---|---|---|---|---|---|---|
| | Before being equipped | After being equipped | Δ | Before being equipped | After being equipped | Δ |
| Cx | 0.276 | 0.278 | 0.003 | 0.255 | 0.273 | 0.018 |
| Cy | 0.278 | 0.283 | 0.005 | 0.238 | 0.261 | 0.023 |
| T | 11400 | 10644 | −756 | 43333 | 14044 | −29289 |
| ΔT (relative to the center) | | | | 31933 | 3400 | |

TABLE 1-continued

When being equipped with a 7 mm-width strip on an edge part having a color
temperature difference of 10,000K (T) or more relative to the center

|  | Phosphor film 7 mm | | | Quantum dot film 7 mm | | |
| --- | --- | --- | --- | --- | --- | --- |
|  | Before being equipped | After being equipped | Δ | Before being equipped | After being equipped | Δ |
| Cx | 0.256 | 0.285 | 0.029 | 0.258 | 0.282 | 0.024 |
| Cy | 0.242 | 0.289 | 0.047 | 0.243 | 0.284 | 0.041 |
| T | 33333 | 9516 | −23817 | 30000 | 10111 | −19889 |
| ΔT (relative to the center) | 21933 | −1128 | | 18600 | −533 | |

Table 1 shows that the Cx and Cy values are not substantially changed before and after being equipped with the strip, which implies that installing the strip does not have an substantial effect on the white balance of the liquid crystal display.

As shown in Table 1, the difference between the color temperature of the screen center part and the color temperature of the screen edge part is 31933 K before the reflective strip being attached, but the difference between the color temperature of the screen center part and the color temperature of the screen edge part is 3400 K after the reflective strip being attached.

It is also shown that the difference between the color temperature of the screen center part and the color temperature of the screen edge part is 21933 K before the phosphor-included strip being attached, and the difference between the color temperature of the screen center part and the color temperature of the screen edge part is 1128 K after the phosphor-included strip being attached.

It is also shown that the difference between the color temperature of the screen center part and the color temperature of the screen edge part is 18600 K before the strip including quantum dots are attached, and the difference between the color temperature of the screen center part and the color temperature of the screen edge part is 533 K after the strip including quantum dots are attached.

Example 2

A reflective film strip having a total width of 5 mm (total length: 5800 cm), a phosphor-included strip having a total width of 5 mm (total length: 5800 cm), and a quantum dot-included strip having a total width of 5 mm (total length: 5800 cm) are prepared, and the color temperature difference between the screen center part and the screen edge part is measured before and after the strips are attached to an edge of the liquid crystal display device shown in FIG. 11.

The reflective film strip is a white PET film (manufacturer. SKC, trade name: SY90) having a thickness of 300 μm, and the region overlapping the photoconversion layer is 2 mm width.

The photoconversion strip including phosphors is a 200 μm-thick film that includes an inorganic phosphor $(Y_3Al_5O_{12}:Ce^{3+}$ (YAG:Ce)) having a size of about 10 μm (in an amount of 8 gram of the inorganic phosphors per 100 gram of the polymer matrix) in the polymer matrix, and the region overlapping the photoconversion layer has a width of 2 mm.

The photoconversion strip including quantum dots is a 200 μm-thick film that includes InP/ZnS quantum dots (in an amount of 1 gram of the QDs per 100 gram of the polymer matrix) in the polymer matrix, and the region overlapping the photoconversion layer has a width of 2 mm.

The strip is attached to the second surface of the mold frame using a double-sided adhesive tape.

Before and after the strips are attached, the Cx value, the Cy value, the color temperature of the screen edge, and the difference between the color temperature of the screen center part and the color temperature of the screen edge part are measured by using CS-2000 equipment manufactured by Konica Minolta (at a measuring angle of 1 degree), and the results are shown in the following Table 2.

TABLE 2

When being equipped with 5 mm-width strip on an edge part having color a
temperature difference of 10,000K (T) or less relative to the center

|  | Center | | | Reflective film 5 mm | | |
| --- | --- | --- | --- | --- | --- | --- |
|  | Before being equipped | After being equipped | Δ | Before being equipped | After being equipped | Δ |
| Cx | 0.276 | 0.278 | 0.003 | 0.263 | 0.276 | 0.013 |
| Cy | 0.278 | 0.283 | 0.005 | 0.256 | 0.272 | 0.016 |
| T | 11400 | 10644 | −756 | 18382 | 11971 | −6411 |
| ΔT (relative to the center) | | | | 6982 | 1327 | |

TABLE 2-continued

When being equipped with 5 mm-width strip on an edge part having color a temperature difference of 10,000K (T) or less relative to the center

|  | Phosphor film 5 mm | | | Quantum dot film 5 mm | | |
| --- | --- | --- | --- | --- | --- | --- |
|  | Before being equipped | After being equipped | Δ | Before being equipped | After being equipped | Δ |
| Cx | 0.263 | 0.280 | 0.017 | 0.264 | 0.282 | 0.018 |
| Cy | 0.257 | 0.271 | 0.015 | 0.258 | 0.275 | 0.017 |
| T | 17996 | 11262 | −6734 | 17380 | 10730 | −6650 |
| ΔT (relative to the center) | 6596 | 618 | | 5980 | 86 | |

Table 2 shows that the Cx and Cy values are not substantially changed before and after being equipped with the strip, which implies that installing the strip does not have a substantial effect on the white balance of the liquid crystal display.

As shown in Table 2, the difference between the color temperature of the screen center part and the color temperature of the screen edge part is 6982 K before the reflective strip being attached, but the difference between the color temperature of the screen center part and the color temperature of the screen edge part is 1327 K after the reflective strip being attached.

It is also shown that the difference between the color temperature of the screen center part and the color temperature of the screen edge part is 6596 K before the phosphor-included strip being attached, and the difference between the color temperature of the screen center part and the color temperature of the screen edge part is 618 K after the phosphor-included strip being attached.

It is also shown that the difference between the color temperature of the screen center part and the color temperature of the screen edge part is 5980 K before the strip including quantum dots are attached, and the difference between the color temperature of the screen center part and the color temperature of the screen edge part is 86 K after the strip including quantum dots are attached.

While the inventive principle has been described in connection with what presently considered to be practical exemplary embodiments, it is to be understood that the inventive scope is not limited to the disclosed embodiments, but, on the contrary, is intended to cover various modifications and equivalent arrangements included within the spirit and scope of the appended claims.

What is claimed is:

1. A mold frame comprising:
a first guide which defines a position of a photoconversion layer or a position of an optical sheet disposed on the photoconversion layer; and
a strip disposed on the first guide,
wherein the first guide comprises:
a first surface defined to face a liquid crystal panel;
a second surface opposite to the first surface; and
to a third surface extending from an edge of first surface to an edge of second surface,
wherein the strip is disposed on the second surface,
wherein the strip contacts an edge portion of a top surface of the photoconversion layer when the optical sheet or the photoconversion layer is combined with the mold frame,
wherein the strip comprises at least one of:
a film comprising a polymer matrix and a light emitting material dispersed in the polymer matrix, wherein the light emitting material comprises a semiconductor nanocrystal, an inorganic phosphor, an organic dye or a combination thereof;
a reflective film comprising a polymer stretched film; and
a stacked film comprising a light scattering layer and a light absorption layer on the light scattering layer.

2. The mold frame of claim 1, wherein the strip is configured to lower a color temperature of an edge of a display screen and, whereby a color temperature difference between a center and the edge portion of the display screen is less than or equal to about 5000K.

3. The mold frame of claim 1, wherein the first surface supports the liquid crystal panel, and the mold frame further comprises at least one of:
a second guide disposed on the first guide and which defines a position of the liquid crystal panel; and
a third guide disposed under the first guide and which further defines the position of the photoconversion layer or the position of the optical sheet.

4. The mold frame of claim 1, wherein the second surface defines the position of the photoconversion layer, and the third surface defines the position of the optical sheet.

5. The mold frame of claim 4, wherein the third surface has a step, and
an upper part of the step or a lower part of the step defines the position of the optical sheet.

6. The mold frame of claim 5, wherein the lower part of the step protrudes further than the upper part of the step and supports a bottom surface of the optical sheet.

7. The mold frame of claim 1, wherein at least a portion of a bottom surface of the strip faces the edge portion of the top surface of the photoconversion layer or faces the edge portion of the top surface of the optical sheet.

8. The mold frame of claim 1, wherein
to the strip comprises the film comprising the polymer matrix and the light emitting material dispersed in the polymer matrix, and
the polymer matrix comprises a thiol-ene resin, a poly (meth)acrylate-based resin, an epoxy resin, a silicone resin, a urethane resin, an olefin resin, polyvinyl, polyester, or a combination thereof.

9. The mold frame of claim 1, wherein the reflective film comprises a white polyester film, a white polypropylene film, or a combination thereof.

10. The mold frame of claim 1, wherein the reflective film has a light transmittance of less than about 10%.

11. The mold frame of claim 1, wherein
the strip comprises the stacked film comprising the light scattering layer and the light absorption layer on the light scattering layer,
the light scattering layer comprises a polymer layer comprising at least one selected from silica, alumina, glass, calcium carbonate ($CaCO_3$), talc, mica, aluminum oxide, barium titanate, barium carbonate, barium sulfate, zinc oxide (ZnO), cerium oxide, titanium oxide, zirconium oxide ($ZrO_2$), aluminum hydroxide, and magnesium oxide (MgO),
the light absorption layer comprises a polymer layer comprising carbon black, a black dye, a black pigment, iron oxide, copper oxide, tin oxide, or a combination thereof, and
the light scattering layer overlaps the edge portion of the top surface of the optical sheet or the edge portion of the top surface of the photoconversion layer when the optical sheet or the photoconversion layer is combined with the mold frame.

12. The mold frame of claim 1, wherein the strip covers an entire of the second surface.

13. The mold frame of claim 1, wherein the strip has a thickness of less than or equal to about 10 millimeters.

14. A backlight unit comprising:
a light source which emits light;
a photoconversion layer spaced apart from the light source and which converts the light incident thereto from the light source to white light and emits the white light; and
a strip overlapping an edge portion of the photoconversion layer,
wherein the strip comprises at least one of:
a film comprising a polymer matrix and a light emitting material dispersed in the polymer matrix, wherein the light emitting material comprises a semiconductor nanocrystal, an inorganic phosphor, an organic dye or a combination thereof;
a reflective film comprising a polymer stretched film; and
a stacked film comprising a light scattering layer and a light absorption layer on the light scattering layer.

15. The backlight unit of claim 14, wherein the strip is configured to lower a color temperature of an edge of a display screen and, whereby a color temperature difference between a center and the edge portion of the display screen is less than or equal to about 5000K.

16. The backlight unit of claim 14, wherein the strip is a photoconversion strip.

17. The backlight unit of claim 16, wherein the photoconversion strip contacts the edge portion of the photoconversion layer.

18. The backlight unit of claim 16, further comprising an optical sheet disposed over the photoconversion layer.

19. The backlight unit of claim 14, further comprising a mold frame and wherein the strip is disposed between the mold frame and the edge portion of the photoconversion layer.

20. The backlight unit of claim 19, wherein the strip is attached to the mold frame.

21. The backlight unit of claim 19, wherein the strip is a photoconversion strip.

22. The backlight unit of claim 21, wherein the photoconversion strip contacts the edge portion of the photoconversion layer.

23. A liquid crystal display comprising:
a liquid crystal panel; and
a backlight unit which provides light to the liquid crystal panel; wherein the backlight unit comprises:
a light source comprising a blue light emitting diode;
a photoconversion layer spaced apart from the light source and which converts light incident from the blue light emitting diode of the light source to white light and emits the white light;
a strip overlapping an edge portion of a photoconversion layer,
wherein the strip comprises at least one of:
a film comprising a polymer matrix and a light emitting material dispersed in the polymer matrix, wherein the light emitting material comprises a semiconductor nanocrystal, an inorganic phosphor, an organic dye or a combination thereof;
a reflective film comprising a polymer stretched film; and
a stacked film comprising a light scattering layer and a light absorption layer on the light scattering layer.

24. The liquid crystal display of claim 23, wherein the strip is configured to lower a color temperature of an edge of a display screen, whereby a color temperature difference between a center and the edge portion of the display screen is less than or equal to about 5000K.

25. The liquid crystal display of claim 23, wherein the strip is a photoconversion strip.

26. The liquid crystal display of claim 23, wherein the photoconversion strip contacts the edge portion of the photoconversion layer.

27. The liquid crystal display of claim 23, further comprising an optical sheet disposed over the photoconversion layer.

28. The liquid crystal display of claim 23, further comprising a mold frame and wherein the strip is disposed between the mold frame and the edge portion of the photoconversion layer.

29. The liquid crystal display of claim 28, wherein the strip is attached to the mold frame.

30. The liquid crystal display of claim 28, wherein the strip is a photoconversion strip.

31. The liquid crystal display of claim 30, wherein the photoconversion strip contacts the edge portion of the photoconversion layer.

32. A photoconversion sheet comprising:
a polymer matrix; and
a light emitting material dispersed in the polymer matrix, wherein the light emitting material comprises a semiconductor nanocrystal, an inorganic phosphor, an organic dye or a combination thereof,
wherein a strip is disposed on a surface of the photoconversion sheet along an edge portion thereof, and
wherein the strip comprises at least one of:
a film comprising a polymer matrix and a light emitting material dispersed in the polymer matrix, wherein the light emitting material comprises a semiconductor nanocrystal, an inorganic phosphor, an organic dye or a combination thereof;
a reflective film comprising a polymer stretched film; and
a stacked film comprising a light scattering layer and a light absorption layer on the light scattering layer.

33. The photoconversion sheet of claim 32, wherein the strip is configured to lower a color temperature of an edge of a display screen, whereby a color temperature difference between a center and the edge portion of the display screen is less than or equal to about 5000K.

34. The photoconversion sheet of claim 32, wherein the strip protrudes from the edge portion to define a step structure.

35. The photoconversion sheet of claim 32, wherein the strip extends along an entire edge of the photoconversion sheet.

\* \* \* \* \*